(12) United States Patent
Aspen et al.

(10) Patent No.: US 6,228,482 B1
(45) Date of Patent: May 8, 2001

(54) MAGNETO-OPTIC RECORDING MEDIUM WITH REDUCED DEMAGNETIZING FIELD THRESHOLD

(75) Inventors: Frank E. Aspen, St. Paul; Mark L. Schroeder, Woodbury, both of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/003,583

(22) Filed: Jan. 6, 1998

(51) Int. Cl.$^7$ ........................................ G11B 5/66
(52) U.S. Cl. ................ 428/332; 428/336; 428/694 ML; 428/694 NF; 428/694 SG; 428/900; 369/13
(58) Field of Search ................ 428/694 ML, 694 NF, 428/694 SG, 900, 332, 336; 369/13

(56) References Cited

U.S. PATENT DOCUMENTS

| | | | |
|---|---|---|---|
| 4,737,947 | 4/1988 | Osato et al. | 369/13 |
| 5,282,095 | 1/1994 | Spruit et al. | 360/59 |
| 5,573,847 | * 11/1996 | Treves | 428/332 |

FOREIGN PATENT DOCUMENTS

| | | |
|---|---|---|
| 0 498 089 | 8/1992 | (EP) . |
| 0 619 577 | 10/1994 | (EP) . |

* cited by examiner

*Primary Examiner*—Leszek Kiliman
(74) *Attorney, Agent, or Firm*—Eric D. Levinson

(57) ABSTRACT

A magneto-optic recording medium having a reduced demagnetizing field threshold incorporates a thin recording layer having a thickness of less than or equal to approximately 15 nm, and preferably less than or equal to approximately 12 nm. The recording medium thereby exhibits a demagnetizing field threshold of less than or equal to approximately 150 Oe, and preferably less than or equal to approximately 120 Oe. Dielectric and reflective layers in the recording medium stack are tuned to achieve acceptable optical and magnetic characteristics for write and readout operations. The reduced demagnetizing field facilitates use of the recording medium in recording applications that use small magnetic fields for recording and erase. The recording medium is particularly useful in near-field, air-incident recording applications employing magnetic field modulation recording techniques.

41 Claims, 13 Drawing Sheets

- ◆ Variable MO thickness
- — Poly. (Variable MO thickness)
- ○ Table3 Vary Hc, thick MO
- □ Table3 Vary Hc, thin MO ◆ Std. MO, 1100 Hrs
△ Thin MO, 1100 Hours
○ Thin MO, 0 Hours
□ Std. MO, 0 Hrs

MAGNETO-OPTIC RECORDING MEDIUM WITH REDUCED DEMAGNETIZING FIELD THRESHOLD

TECHNICAL FIELD

The present invention relates to magneto-optic (MO) recording media, including media useful in near-field, air-incident magneto-optic recording applications employing magnetic field modulation.

BACKGROUND INFORMATION

In magneto-optic recording, data is represented as a magnetized domain on a magnetizable recording medium. Each domain is a stable magnetizable region representative of a data bit. Data is written to the medium by applying a focused beam of high intensity light in the presence of a magnetic field. The recording medium typically includes a substrate, a magneto-optic recording layer, a reflective layer, and two or more dielectric layers that together form the MO stack. In substrate-incident recording, the beam passes through the substrate before it reaches the recording layer. The reflective layer in a substrate-incident recording medium is formed on a side of the recording layer opposite the substrate. The reflective layer reflects the beam back to the recording layer, increasing overall exposure and absorption. In near-field, air-incident recording, the beam does not pass through the substrate. Instead, a solid immersion lens (SIL) is used to transmit the beam across an extremely thin air gap and through the top of the recording medium to the recording layer. The SIL transmits the beam by evanescent coupling across the air gap. In an air-incident recording medium, the reflective layer is formed adjacent the substrate and the thin air gap forms one of the layers in the MO stack from an optical performance standpoint. The recording beam heats a localized area of the recording medium above its Curie temperature. The area is allowed to cool in the presence of a magnetic field. The magnetic field overcomes the demagnetizing field of the perpendicular anisotropy recording medium, causing the localized area to acquire a particular magnetization. The direction of the magnetic field and the resulting magnetization determine the data represented at the domain. With beam modulation recording techniques, the magnetic field is maintained in a given direction for period of time as the beam is selectively modulated across the recording medium to achieve desired magnetization. According to magnetic field modulation (MFM) recording techniques, the beam is continuously scanned across the recording medium while the magnetic field is selectively modulated to achieve desired magnetization. Alternatively, the beam can be pulsed at a high frequency in coordination with modulation of the magnetic field. Examples of various MFM recording techniques are described in The Physical Principles of Magneto-optical Recording, by Masud Mansuripur, Cambridge University Press 1995.

To read the recorded data, the drive applies a lower intensity plane-polarized beam to the recording medium. Upon transmission through and/or reflection from the recording medium, the plane-polarized beam experiences a Kerr rotation in polarization. The Kerr angle of rotation varies as a function of the magnetization of the localized area. An optical detector translates the Kerr rotation angle into an appropriate bit value.

SUMMARY

The present invention is directed to a magneto-optic recording medium having a reduced demagnetizing field threshold. The recording medium incorporates a thin magneto-optical recording layer that allows writing and erasure of data using relatively small magnetic fields. Consequently, this recording medium is particularly useful for high-frequency magnetic field modulation recording applications. To protect the thin recording layer against reactants, the recording medium may include dielectric layers that encapsulate the recording layer and are formed from a material that is substantially non-reactant with the recording layer. It is also desirable that the dielectric layers exhibit only a small degree of surface roughness, preventing significant nonuniformities in the domain walls of the recording layer, and thereby contributing to the reduced demagnetizing field threshold. An example of a suitable material is doped, amorphous silicon carbide. In an air-incident embodiment, it is also desirable that the other layers in the MO stack, along with the recording layer, be selected and optimized in thickness to provide a recording medium that yields consistent performance for variations in air gap thickness. Such variations can result from relative movement of the recording medium and recording head during operation. The reduced demagnetizing field threshold facilitates use of the medium with recording techniques employing relatively small magnetic fields. For effective recording and/or erasure, the magnetic field applied by a magneto-optic drive must be sufficient to overcome the demagnetizing field threshold of the magnetic recording medium. In some applications, however, it may be desirable to employ relatively small magnetic fields to write and erase data. In near-field, air-incident recording, for example, the applied magnetic fields used for write and erasure processes may be significantly smaller than in substrate-incident applications.

Substrate-incident applications ordinarily make use of beam modulation recording techniques in which the applied magnetic field is fixed in a given direction for a long period of time. Beam modulation recording thereby allows relatively large fields, typically on the order of 200 to 350 Oerstad (Oe), to be used for writing and erasing. In the near-field scheme, however, it is desirable to use magnetic field modulation recording techniques. For example, near-field recording is expected to provide extremely large storage densities that require high data rates. The increased inductance associated with higher magnetic fields can undermine data rate capabilities. Due to this inductance and the magnetic response time of the recording medium, it may be necessary to use smaller magnetic fields for the high frequency modulation necessary for high-speed recording. For a near-field optical drive, the magnetic field used for magnetic field modulation may be on the order of 60 to 150 Oe, well below the demagnetizing fields of many other recording techniques using existing media.

In accordance with the present invention, there is provided a recording medium having a magneto-optic recording layer with a reduced thickness, resulting in a reduced demagnetizing threshold. The demagnetizing field threshold of a magnetic body varies with changes in the geometry of that body. For example, the demagnetizing field threshold of a magneto-optic thin film can be reduced by reducing its thickness. By reducing the thickness of the recording layer and tuning associated layers appropriately, the recording medium of the present invention provides effective results for recording techniques involving relatively small magnetic fields, such as magnetic field modulation.

The present invention provides, in one embodiment, a magneto-optic recording medium comprising a magneto-optic recording layer having a thickness of less than or equal to approximately 15 nm.

In another embodiment, the present invention provides a magneto-optic recording medium comprising in order a substrate, a first dielectric layer, a single magneto-optic recording layer, and a second dielectric layer, wherein the recording layer has a thickness of less than or equal to approximately 15 nm.

In a further embodiment, the present invention provides a magneto-optic recording medium comprising in order a substrate, a first dielectric layer, a single magneto-optic recording layer, and a second dielectric layer, wherein the recording layer is selected to provide a demagnetizing field threshold of less than or equal to approximately 150 Oe.

Other advantages, features, and embodiments of the present invention will become apparent from the following detailed description and claims.

DETAILED DESCRIPTION

Figure 1A:
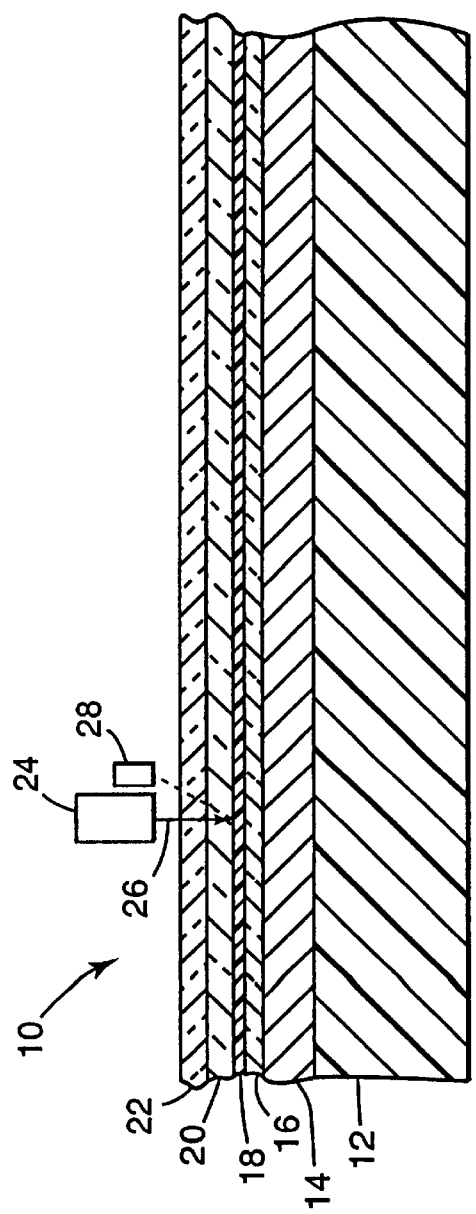
FIG. 1A is a cross-sectional diagram of a magneto-optic recording medium having a thin MO layer and a reduced demagnetizing field threshold.

FIG. 1A is a cross-sectional diagram of a magneto-optic recording medium having a reduced demagnetizing field threshold, in accordance with an exemplary embodiment of the present invention. Recording medium 10 is particularly useful in near-field, air-incident recording applications. As shown in FIG. 1A, recording medium 10 includes a substrate 12, a reflective layer 14, a first dielectric layer 16, a magneto-optic recording layer 18, a second dielectric layer 20, and a third dielectric layer 22. Third dielectric layer 22 and reflective layer 14 are optional. Recording medium 10 is constructed for and preferably used in air-incident, near field recording applications. In other words, recording medium 10 is constructed for applications in which a recording beam does not pass through substrate 12, but rather is incident on third dielectric layer 22, if provided, before passing to recording layer 18. If third dielectric layer 22 is not incorporated in recording medium 10, the air-incident beam is incident on second dielectric layer 20 before passing to recording layer 18.

With further reference to FIG. 1, in an air-incident, near-field recording system, a laser 24 or other heat source can be provided to write data to the recording medium 10 in combination with a magnetic field applied by a magnetic head assembly. For air-incident applications, laser 24 is oriented or optically coupled to transmit a beam 26 to recording layer 18 via second and third dielectric layers 20, 22. Beam 26 serves to heat recording layer 18 at particular locations. Readout also can be achieved by application of beam 26 to recording layer 18 at a lower intensity. A detector 28 is oriented to receive a reflected component of the read beam. Detector 28 translates the Kerr rotation angle of reflected component to an appropriate bit value. Beam 26 may be transmitted, for example, by a solid immersion lens (SIL). An example of a system having an SIL for near-field, air-incident recording of magneto-optic media is disclosed in U.S. Pat. No. 5,125,750 to Corle et al. The SIL may be integrated with a magnetic head assembly to form a flying head that flies above the surface of recording medium 10 and is separated by the medium by the thin air gap or "bearing." The air gap forms part of the MO stack of recording medium 10 from an optical performance standpoint. The SIL transmits beam 26 across the air gap via evanescent coupling.

Recording layer 18 preferably comprises a rare earth transition metal alloy such as FeTbCo or FeTbCoTa. A reduced demagnetizing field threshold is desirable for the use of recording techniques that employ relatively small magnetic fields. To provide a reduced demagnetizing field threshold, in accordance with the present invention, recording layer 18 preferably is made extremely thin. For example, the thickness of recording layer 18 preferably is less than or equal to approximately 15 nm. In particular, the thickness of recording layer 18 may be in a range of less than or equal to approximately 15 nm and greater than or equal to approximately 6 nm, and preferably is in a range of less than or equal to approximately 12 nm and greater than or equal to approximately 8 nm. The thickness and composition of recording layer 18 can be selected to provide a reduced demagnetizing field threshold of less than or equal to approximately 150 Oe. In particular, recording layer 18 may produce a demagnetizing field threshold in a range of less than or equal to approximately 150 Oe and greater than or equal to approximately 60 Oe, and preferably less than or equal to approximately 120 Oe and greater than or equal to approximately 80 Oe. In addition to reducing the demagnetizing field threshold, the reduced thickness of recording layer 18 requires less material, resulting in significant savings in manufacturing cost.

The extremely small thickness of recording layer 18 can result in instability problems. Specifically, the thinner the recording layer 18 is, the more susceptible it can be to migrating reactants. Hence, common dielectric materials like silicon nitride ($Si_3N_4$) can adversely affect the stability of recording layer 18. For this reason, first and second dielectric layers 16, 20 preferably are formed from a dielectric material that exhibits low reactivity with recording layer 18, and provides sufficient protection against outside reactants. Also, it is desirable that such dielectric material be substantially thermally conductive to allow effective heat dissipation. The dielectric material should also have optical characteristics sufficient to allow effective transmission of the recording beam to recording layer 18. An example of a suitable material is silicon carbide ($SiC_x$). Silicon carbide has been observed to provide recording layer 18 with an effective barrier against reactants. At the same time, silicon carbide is an effective thermal conductor and allows effective optical transmission. Also, silicon carbide is susceptible to conventional dc sputtering techniques, thereby facilitating fabrication of recording medium 10. Examples of suitable silicon carbide compositions are disclosed in U.S. Pat. No. 5,158,834 to Funkenbusch. In particular, an example of a suitable material is a silicon carbide/graphite composition is marketed under the tradename "Hexoloy SG," and is commercially available from Carborundum, Inc., Amherst, N.Y., USA.

Silicon carbide also provides another important advantage. Silicon carbide not only protects recording layer 18 against reactants, but also contributes to the desired reduction in the demagnetizing field threshold. In particular, silicon carbide improves the surface smoothness of recording layer 18. Silicon carbide compositions as disclosed in above-referenced U.S. Pat. No. 5,158,834 have been found to exhibit an average surface roughness on the order of 0.5 nm when deposited by conventional dc sputtering techniques. In contrast, silicon nitride has an average surface roughness approaching 2 nm when deposited using conventional techniques. Recording layer 18 is deposited over first dielectric layer 16 in the air-incident embodiment of FIG. 1A. As a result, recording layer 18 tends to conform to and replicate the surface of first dielectric layer 16 on which it is deposited. As recording layer 18 becomes thinner, its replication to the surface roughness of first dielectric layer 16 becomes more pronounced relative to the thickness of the layer. With excessive surface roughness, domain walls within recording layer 18 can become "pinned" to grain boundaries. This "pinning" phenomena is known in the art, and can result in reduced mobility of the domain walls within the recording material for a given magnetic field level. As a result, increased magnetic energy is necessary to move the domain walls. Thus, excessive surface roughness may undesirably produce a higher demagnetizing field threshold.

The use of a dielectric material having reduced surface roughness for first dielectric layer 16 results in reduced surface roughness in recording layer 18. With reduced surface roughness, recording layer 18 requires less magnetic energy for movement of domain walls, and provides a reduced demagnetizing field threshold. Thus, if a material other than silicon carbide is selected for first dielectric layer 16, it is desirable that such material exhibit a surface roughness as low as possible and preferably less than or equal to approximately 1 nm. An example of another dielectric material that may provide acceptable surface roughness characteristics is silicon dioxide ($SiO_2$).

First dielectric layer 16 may have a thickness in a range of less than or equal to approximately 60 nm and greater than or equal to approximately 5 nm, and preferably is in a range of less than or equal to approximately 30 nm and greater than or equal to approximately 15 nm. Second dielectric layer 20 may have a thickness in a range of less than or equal to approximately 30 nm and greater than or equal to approximately 5 nm, and preferably is greater than or equal to approximately 20 nm. Dimensions in the above ranges are appropriate, in combination with the dimensions of other layers, to tune the medium for effective recording performance.

First and second dielectric layers 16, 20 preferably are formed to encapsulate recording layer 18, protecting it from migrating reactants. Although silicon nitride and other common dielectric materials may be undesirable in view of the extremely small thickness of recording layer 18, such materials can provide desirable optical and surface characteristics. Accordingly, as shown in FIG. 1A, an additional layer of a dielectric material such as silicon nitride can be added over second dielectric layer 20 as third dielectric layer 22. Also, a metal layer having relatively high thermal conductivity and high reflectivity can be formed over substrate 12 and below first dielectric layer 16 as reflective layer 14.

Materials such as silicon nitride can provide a desirable index of refraction for optimum readout. Third dielectric layer 20 may have a thickness in a range of less than or equal to approximately 200 nm and greater than or equal to approximately 5 nm, and preferably less than or equal to approximately 50 nm and greater than or equal to approximately 20 nm. Reflective layer 14 may comprise, for example, an aluminum chrome alloy. Reflective layer may have a thickness in a range of less than or equal to approximately 130 nm and greater than or equal to approximately 20 nm, and preferably less than or equal to approximately 60 nm and greater than or equal to approximately 30 nm. Substrate 12 may have a thickness on the order of 0.5 to 2.5 mm for near-field recording applications, and may be constructed from polycarbonate. Other materials such as aluminum or glass alternatively may be used. In combination with the dimensions of the other layers, the dimensions of substrate 12, reflective layer 14, and third dielectric layer 22 are selected to tune recording medium 10 for effective performance. An optional protective layer could be formed over third dielectric layer 22, if desired, to additionally protect the thin film materials in the magneto-optic layers from outside reactants and further improve the recording performance of the media.

With the reduced thickness of recording layer 18, each of the other layers is tuned for desired response, in view of a number of performance parameters. Taking into account the various layer dimensions necessary to achieve desired magnetic and optical response, in a preferred embodiment, it is contemplated that the combined thickness of recording layer 18, first dielectric layer 16, and second dielectric layer 20 may be less than or equal to approximately 75 nm and greater than or equal to approximately 30 nm. In this preferred embodiment, the combined thickness of recording layer 18, first dielectric layer 16, second dielectric layer 20, and third dielectric layer 22, if provided, may be less than or equal to approximately 125 nm and greater than or equal to approximately 60 nm. Also, the combined thickness of recording layer 18, first dielectric layer 16, second dielectric layer 20, and reflective layer 14, if provided, may be less than or equal to approximately 135 nm and greater than or equal to approximately 60 nm. Finally, it is contemplated that the combined thickness of recording layer 18, first dielectric layer 16, second dielectric layer 20, reflective layer 14, and third dielectric layer 22 may be less than or equal to approximately 185 nm and greater than or equal to approximately 80 nm. To optically tune recording medium 10 for near-field recording applications, it is also necessary to take into account the dimension of the air gap between the recording head and third dielectric layer 22. In other words, the air gap forms part of the magneto-optic stack for optical purposes. For the above configurations, it is assumed that the air gap is on the order of 75 to 125 nm. It is desirable that the various layers of recording medium 10 be selected and optimized in thickness to provide consistent read and write performance despite variations in air gap thickness, and preferably variations falling in the above air gap range.

Figure 1B:
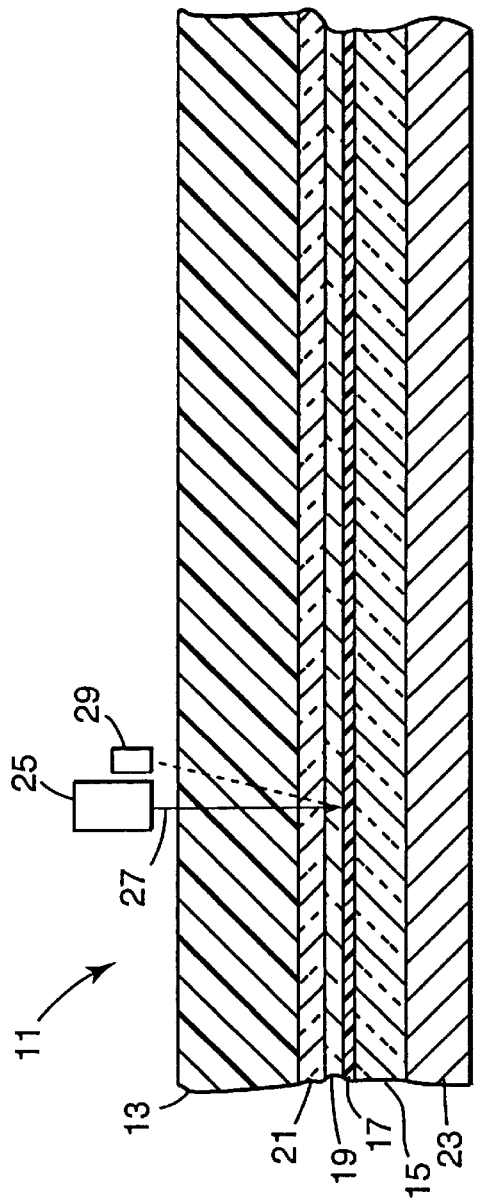
FIG. 1B is a cross-sectional diagram of another magneto-optic recording medium having a thin MO layer and a reduced demagnetizing field threshold

FIG. 1B is a cross-sectional diagram of a magneto-optic recording medium 11 having a reduced demagnetizing field threshold, in accordance with another exemplary embodiment of the present invention. Recording medium 11 is particularly useful in substrate-incident recording applications. As shown in FIG. 1B, recording medium 11 includes a substrate 13, a first dielectric layer 15, a magneto-optic recording layer 17, a second dielectric layer 19, a third dielectric layer 21, and a reflective layer 23. Third dielectric layer 21 and reflective layer 23 are optional. Recording medium 10 is constructed for and preferably used in substrate-incident recording applications. In other words, recording medium 11 is constructed for applications in which a recording beam passes through substrate 13, and is incident on second dielectric layer 19 and third dielectric layer 21, if provided, before passing to recording layer 18.

With further reference to FIG. 1B, in a substrate-incident recording system, a laser 25 or other heat source can be provided to write data to the recording medium 11 in combination with a magnetic field applied by a magnetic head assembly. For substrate-incident applications, laser 25 is oriented or optically coupled to transmit a beam 27 to recording layer 17 via substrate 13 and second and third dielectric layers 19, 21. Beam 27 serves to heat recording layer 17 at particular locations. Readout also can be achieved by application of beam 27 to recording layer 17 at a lower intensity. A detector 29 is oriented to receive a reflected component of the read beam. Detector 19 translates the Kerr rotation angle of the reflected component to an appropriate bit value.

The various layers of recording medium 11 substantially conform to those incorporated in the air-incident embodiment shown in FIG. 1A, but may vary in orientation and/or thickness. Accordingly, as in the embodiment of FIG. 1A, recording layer 17 preferably comprises a rare earth transition metal alloy such as FeTbCo or FeTbCoTa, and preferably is made extremely thin. In particular, recording layer 17 has dimensions on the order of those described with respect to recording layer 18. As in the embodiment of FIG. 1A, recording medium 11 is thereby capable of providing a reduced demagnetizing field threshold of less than or equal to approximately 150 Oe. In particular, recording medium 11 may produce a demagnetizing field threshold in a range of less than or equal to approximately 150 Oe and greater than or equal to approximately 60 Oe, and preferably in a range of less than or equal to approximately 120 Oe and greater than or equal to approximately 80 Oe.

To protect the extremely thin recording layer 17 against reactants, as in the embodiment of FIG. 1A, first and second dielectric layers 15, 19 preferably are formed from a dielectric material such as one of the silicon carbide compositions disclosed in above-referenced U.S. Pat. No. 5,158,834. A suitable material is marketed under the tradename "Hexoloy SG," and is commercially available from Carborundum, Inc., Amherst, N.Y., USA. As in the air-incident embodiment of FIG. 1A, first dielectric layer 15 may have a thickness in a range of less than or equal to approximately 60 nm and greater than or equal to approximately 5 nm, and preferably is in a range of less than or equal to approximately 30 nm and greater than or equal to approximately 15 nm. Also, second dielectric layer 19 may have a thickness in a range of less than or equal to approximately 30 nm and greater than or equal to approximately 5 nm, and preferably is greater than or equal to approximately 20 nm.

Third dielectric layer 21 may comprise, for example, silicon nitride, and may have a thickness in a range of less than or equal to approximately 60 nm and greater than or equal to approximately 5 nm, and preferably less than or equal to approximately 50 nm and greater than or equal to approximately 20 nm. Reflective layer 23 may comprise, for example, an aluminum chrome alloy, and may have a thickness in a range of less than or equal to approximately 200 nm and greater than or equal to approximately 20 nm. Substrate 13 may have a thickness in a range of less than or equal to approximately 2.5 mm and greater than or equal to 0.5 mm, and may be constructed from any of a variety of materials such as polycarbonate, aluminum, or glass.

Set forth below are examples of recording media constructed in accordance with the present invention. In particular, provided below is a comparative example with conventional substrate-incident magneto-optical media. Also provided is an example of the performance of the recording medium of the present invention for a range of layer thicknesses, conditions, and performance criteria as well as an example of the effect of environmental stresses on such a recording medium. The experimental results indicated below demonstrate the effectiveness of a recording medium having a thin magneto-optical recording layer in achieving acceptable magneto-optical recording for recording techniques that make use of relatively small magnetic fields.

EXAMPLE 1

In a first, comparative example, a number of performance parameters were used to evaluate the performance of a recording medium in accordance with the present invention. The parameters include the demagnetizing Field Threshold (FT), which is the minimum magnetic field required to erase a previously written domain, the maximum Carrier-to-Noise Ratio (CNR), the media coercivity ($H_c$), and the drive Byte Error Rate (BER). It is expected that a recording medium constructed according to the present invention will be particularly useful with air-incident, near field recording drives using magnetic field modulation. However, due to the scarce availability of near-field recording drives during the early stages of development of that technology, the performance parameters were measured using standard 2X substrate-incident media testers and drives. For this reason, the test media was constructed for substrate-incident recording. Nevertheless, the test results of this comparative example are viewed as a reasonable analog to the performance of an air-incident embodiment.

The control medium in this first example was a standard 2X, 1.3 GB, 130 mm magneto-optical disk, commercially available from Imation Enterprises Corp. of Oakdale, Minn., U.S.A., and marketed under the Imation/3M trademarks. The composition and thickness of each layer in the control medium and the test medium are indicated below in Table 1. In Table 1, the recording medium of the present invention is designated "thin MO," whereas the control medium is designated "control." In this first example, the thin MO medium was constructed as a 130 mm, substrate-incident disk for acceptance in an available tester. Accordingly, the thin MO medium and conventional, control medium each included a substrate, a first dielectric layer D1 formed over the substrate, a recording (MO) layer formed over first dielectric layer D1, a second dielectric layer D2 formed over the MO layer, and a metal, reflective layer formed over the second dielectric layer. Thus, the substrate-incident test medium substantially conformed to the substrate-incident medium 11 of FIG. 1B, but did not incorporate a third dielectric layer.

TABLE 1

| Media | Dielectric 1 | MO layer | Dielectric 2 | Reflector |
|---|---|---|---|---|
| control | 26 nm, $SiC_x$ | 22 nm, FeTbCoTa | 10 nm, $SiC_x$ | 75 nm, AlCr |
| thin MO | 7 nm, $SiC_x$ | 9 nm, FeTbCoTa | 28 nm, $SiC_x$ | 200 nm, AlCr |

The layers in the thin MO medium were varied to maintain a similar media reflectivity and write threshold. The final composition and thickness for each layer of the thin MO medium that was drive tested also can be seen in Table 1. The composition of the thin MO recording layer was kept constant except in the study of $H_c$ versus FT, as set forth below. In that study, the terbium concentration in the thin MO recording layer was slightly increased. Excluding this slight increase, the thin MO recording layer composition throughout this example, in atomic percent, was: 67% Fe, 23.5% Tb, 8% Co, and 1.5% Ta.

The FT is defined by the smallest magnetic field that can overcome the demagnetizing field of the MO layer. The FT is measured by attempting to write on the disk by incrementally increasing the magnetic field from an erasure direction to a write direction. Each write attempt is done with the laser at an optimum write power. The FT is reached when a stable bit is written that produces a CNR above 8 dB. As mentioned above, a standard 2X, MO dynamic tester was used to characterize the FT dependence on thin MO layer thickness. The media was tested at standard ISO writing conditions for 2X media. Again, this substrate-incident testing is believed to provide a reasonable representation of air-incident response due to the magnetic similarities between the substrate-incident and air-incident media.

The FT data was collected with the thin MO layer thickness ranging from 8 nm to 31 nm. These results are plotted and can be seen in FIG. 2. The data indicate that the thickness of the thin MO layer not only has a significant influence on the FT, but that FT responds to changes in MO layer thickness in a substantially linear and predictable fashion. This data also suggest that the thin MO layer can provide an FT particularly acceptable for near-field recording at a thickness of approximately 12 nm.

One concern for a medium with an extremely thin MO recording layer is its ability to supply a sufficient signal to optical detectors in the drive to enable reading of the recording data. A reliable indicator of MO media dynamic performance is the CNR. Again, the CNR was determined by coating films in a substrate-incident orientation and using the same tester as above. The CNR was compared for the standard MO media and the thin MO layer media described in Table 1. Three disks of each media type were characterized. The collected data are set forth in Table 2. The data in Table 2 indicates that there is no significant difference in the CNR for the standard MO layer relative to the thin MO recording layer media of the present invention.

An additional performance concern is a reduction in $H_c$. Specifically, if the thickness of the MO recording layer is reduced while keeping the magnetic composition constant, the $H_c$ of the resulting recording layer drops. It is ordinarily desirable that the $H_c$ of the medium remain above 2,000 Oe to prevent accidental erasure. For a comparison of the thin MO recording layer versus standard MO recording layer thickness, the $H_c$ was measured for both media shown in Table 1. The resulting data, presented in Table 2 below, indicate that $H_c$ for the thin MO layer medium can be significantly lower than that for media having a standard MO layer thickness, as expected. Nevertheless, as indicated in Table 2, the $H_c$ for the thin MO layer medium remains well above acceptable levels.

TABLE 2

| Disk | MO (nm) | CNR (dB) | $H_c$ (Oe) |
|---|---|---|---|
| 1 | 22 | 44.4 | 6,580 |
| 2 | 22 | 45.1 | 6,640 |
| 3 | 22 | 45.1 | 6,805 |
| 4 | 9 | 45.5 | 3,000 |
| 5 | 9 | 45.0 | 3,500 |
| 6 | 9 | 43.6 | 3,100 |

Figure 2:
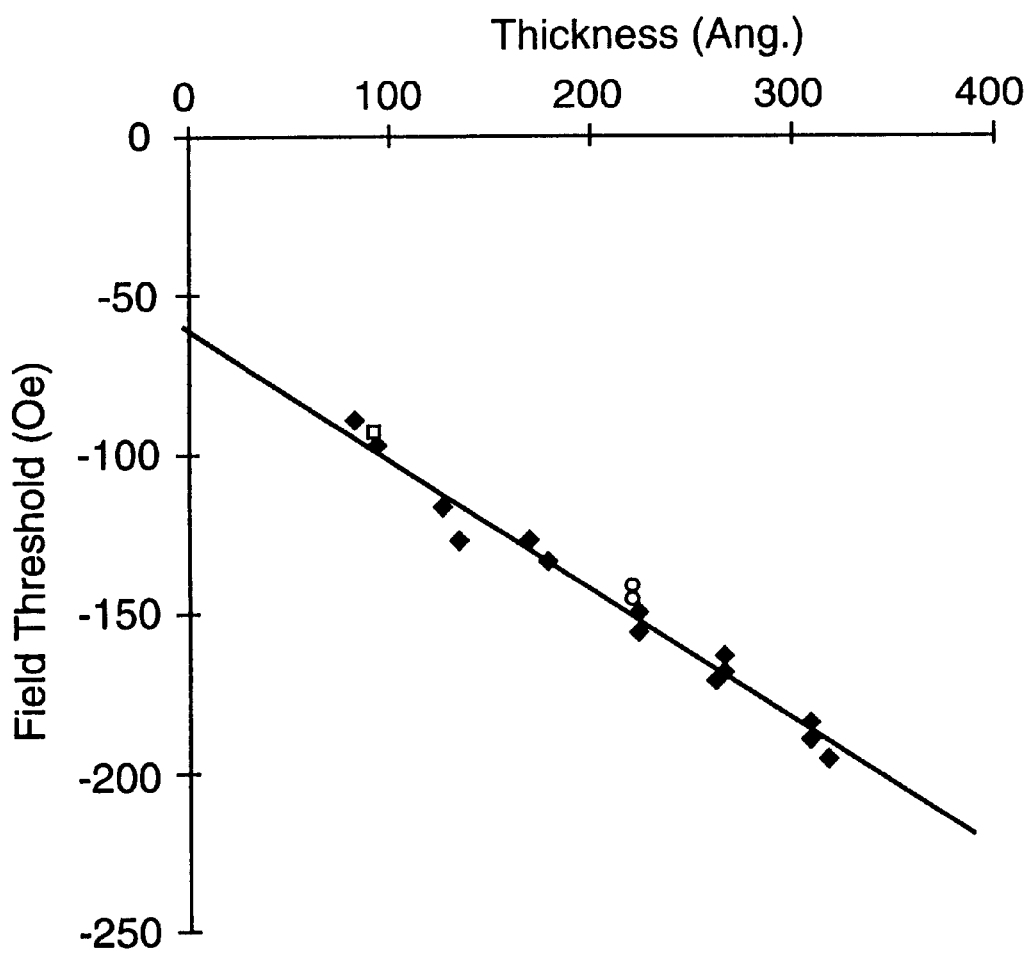
FIG. 2 is a graph illustrating the effect of recording layer thickness on demagnetizing field threshold in a magneto-optical recording medium.

To determine the FT dependence of the media on the $H_c$, two thin MO layer disks and two standard MO layer disks were constructed. Both sets consisted of one high $H_c$ disk and one low $H_c$ disk. The higher coercivity was obtained by slightly increasing the terbium concentration in the MO alloy. The results of this study can be seen in Table 3. The data indicate that low $H_c$ may slightly reduce the FT. However, the difference seen is insignificant for purposes of recording performance. The FT data from these disks, which is also shown in the graph of FIG. 2, is consistent with the earlier results from the MO thickness study.

TABLE 3

| Disk | MO (nm) | ("H" disk) $H_c$ (Oe) | Field Threshold (Oe) |
|---|---|---|---|
| 7 | 9 | 6,502 | −100 |
| 8 | 9 | 4,000 | −94 |
| 9 | 22 | 5,697 | −142 |
| 10 | 22 | 10,807 | −148 |

The drive performance of the standard MO layer media and thin MO layer media were also compared to assess relative Byte Error Rate (BER) performance. Twenty disks of each type were constructed and sent through a standard 2X, MO drive bank. The test consists of an erase, write, and verify cycle which covers approximately 50 percent of the disk surface. The response measured was the BER during the read cycle. The average BER for each disk type, standard and thin MO, as indicated by the testing, can be seen in Table 4.

TABLE 4

| Average BER (E-5) | |
|---|---|
| Standard MO | Thin MO |
| 0.554 | 0.550 |

The data indicate that there is no significant difference in BER levels for the standard MO layer and the thin MO layer media. A small number of statistical high flyers from the twenty standard MO layer disks were discarded so that the comparison between averages would not be skewed. A high flyer is usually caused by debris on the disk, so it is more accurate to eliminate these data points when comparing film performance.

The comparative example above shows that the incorporation of a thin MO layer can help satisfy the FT criteria of recording techniques using relatively small magnetic fields, such as near-field, air-incident techniques using magnetic field modulation. In particular, the example indicates that MO recording layer thickness can be varied to change the FT, and that the media $H_c$ has very little influence. Further, the dynamic testing included in the above example indicated that use of a thin MO layer in accordance with the present invention does not degrade the CNR or the BER drive performance of the media.

EXAMPLE 2

In a second example, an air-incident recording medium with a thin MO layer was constructed substantially as shown in FIG. 1A. The combined thickness of the various layers, excluding the substrate, was approximately 120 nm, which is significantly thinner than existing MO thin film stacks. In this example, the air-incident, thin MO layer medium was seen to satisfy all media performance criteria for near-field optical flying head recording applications known to date.

The thin MO layer film stack of this example was optimized using a model that incorporates the narrow air gap between the recording medium and the optical head of the near-field optical drive. In other words, the stack is modeled to include the substrate, a metal, reflective layer formed over the substrate, a first dielectric layer formed over the metal layer, the thin MO recording layer, a second dielectric layer formed over the thin MO layer, a third dielectric layer formed over the second dielectric layer, the air gap disposed between the third dielectric layer and the optical head, such as a flying head equipped with solid immersion lens (SIL), and the SIL itself.

Important optical characteristics of the resulting thin MO, air-incident medium include reflectivity, rotation, ellipticity, the figure of merit (FOM) and phase shift. The FOM and phase shift are calculated using the first three parameters, i.e., reflectivity, rotation, and ellipticity. These characteristics were calculated while varying the thickness of each layer. The thickness for each layer was varied separately while the other layer thicknesses were held at chosen default values, as shown in Table 5 below.

TABLE 5

Thin film design and default values for each layer:

Modeling Wavelength 680 nm

Angle of incidence, polar=0.00, azimuthal=0.00

Medium index above substrate=1.00

Medium index above films=2.15 (SIL)

| Layer | Composition | Thickness | n | k |
|---|---|---|---|---|
| 1. Substrate | polycarbonate | 2.0 mm | 1.58 | 0.00 |
| 2. Reflector | AlCr | 60 nm | 1.256 | 9.277 |
| 3. Dielectric 1 | $SiC_x$ | 6 nm | 3.044 | 0.208 |
| 4. MO | FeTbCoTa | 12 nm | n+ = 3.5368 | k+ = 3.4874 |
| (atomic % = 67, 23.5, 8, 1.5) | | | n− = 3.4346 | k− = 3.4148 |

-continued

| Layer | Composition | Thickness | n | k |
|---|---|---|---|---|
| 5. Dielectric 2 | $SiC_x$ | 12 nm | 3.044 | 0.208 |
| 6. Dielectric 3 | $SiN_x$ | 31 nm | 2.07 | 0.005 |

Modeling was carried out at a wavelength of 680 nm and a constant air-gap of 100 nm. Finally, these same responses were characterized with respect to the air-gap distance. The air gap, which varies over the radius of the disk, is defined by the distance the SIL head is flying from the disk. The fly height varies due to changing linear velocities encountered by the SIL head and mechanical characteristics of a swing arm supporting the head. In the model, this air-gap is considered to be the first thin film layer, while the index of the SIL represents the environment above the film stack. In this case, the index of the SIL was 2.15.

The air-incident media design, indicated in Table 5, was both modeled and experimentally produced. The D1 and D2 layers were dielectric layers formed with $SiC_x$ films that encapsulated the MO layer. The D3 layer was a dielectric layer formed from $SiN_x$, as indicated in Table 5, and providing an overcoat. This example media of Table 5 was produced in a production thin film coater using standard production raw materials. The AlCr was 4 weight % chromium in aluminum. This layer was deposited over the polycarbonate substrate by dc sputtering at a rate of 1.3 nm per second using argon at a pressure of one milli-Torr (mT). Dielectric layer D1 was a doped silicon carbide containing substantial amounts of nitrogen and boron, along with other minor dopants. The sputtering target was obtained from Carborundum, Inc., Amherst, N.Y., USA, and constituted a silicon carbide/graphite composition. The trade name for this sputtering target is "Hexoloy SG." The D1 layer was deposited at a rate of 0.4 nm/second in one mT of argon. The MO layer was dc sputtered from an alloy target of 67% Fe, 23.5% Tb, 8.0% Co, and 1.5% Ta at a rate of 0.8 nm/second in one mT of argon. The D2 layer was deposited over the MO layer in the same manner as the D1 layer, except that it was deposited at 0.8 nm/second. The D3 layer was reactively sputtered from a boron-doped silicon target at a rate of 0.7 nm/second at a pressure of approximately 12 mT. Nitrogen gas was introduced at a rate sufficient to obtain an index of refraction equal to 2.07 plus or minus 0.02.

In the above example, the composition of the "Hexoloy SG" $SiC_x$ compound in the D1 and D2 layers, i.e., the first and second dielectric layers, has a spectrum indicating the presence of carbon, boron, silicon, nitrogen, and oxygen in detectable concentrations. Using the peak intensities and standard sensitivity factors known in the art, the atomic concentration of this silicon carbide ($SiC_x$) dielectric is estimated as Si(35%)C(51%)B(7%)N(5%)O(2%) which yields a value of x=0.51/0.35=1.47. The $SiN_x$ composition of the third dielectric layer D3 was $Si_3N_4$ such that the value of x is approximately 1.3.

Figure 3:
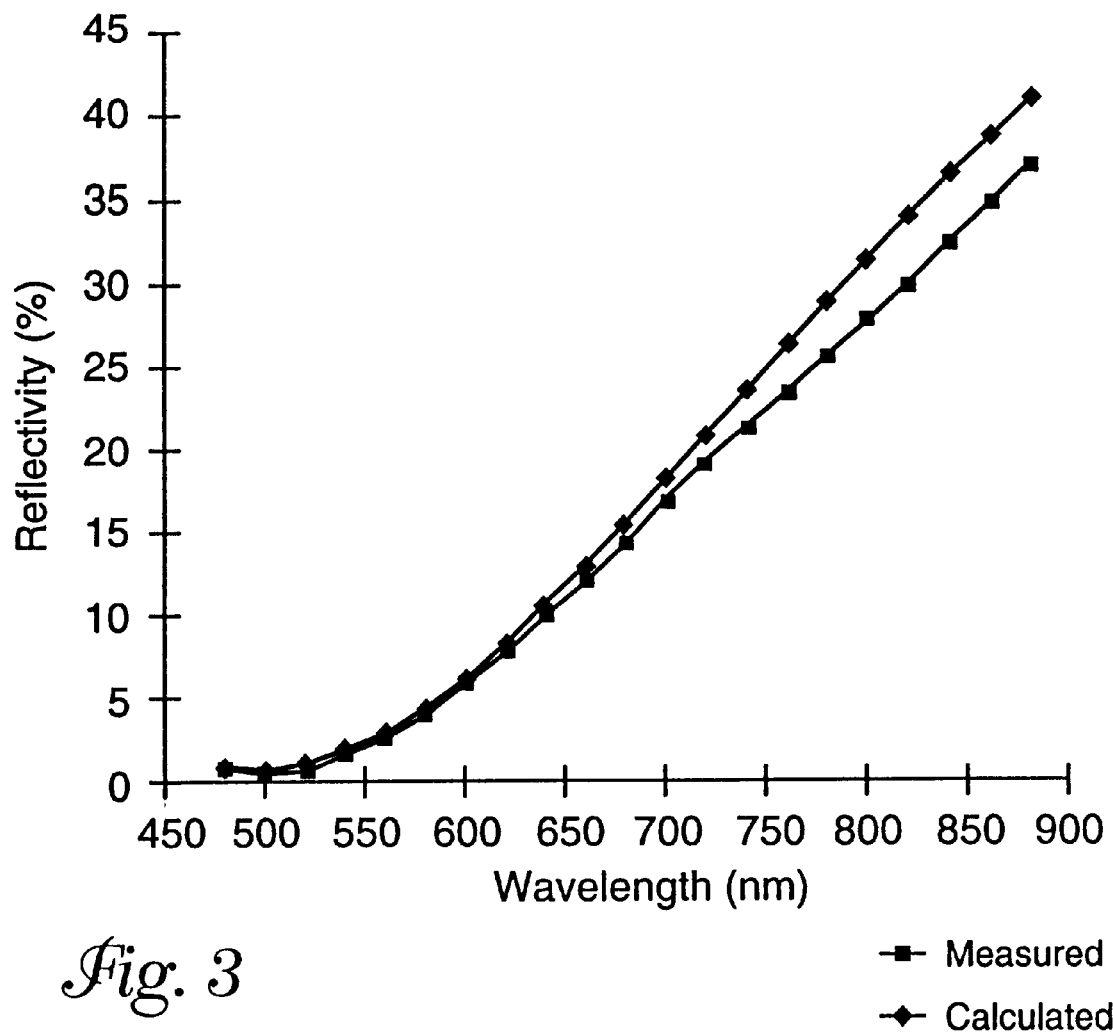
FIG. 3 is a graph illustrating the reflectivity response of a magneto-optical recording medium having a thin MO layer over a range of incident wavelengths.

For the stack design described in Table 5, the modeled and experimental reflectivity results were compared. In each case, the reflectivity dependence on wavelength was characterized over a 480 nm to 880 nm range, as shown in the graph of FIG. 3. The experimental data was measured with a conventional white light source normally incident on a flat area of the air-incident films. The data show that the modeled reflectivity and the experimental reflectivity substantially correspond to one another. At the shorter wavelengths the data is in close agreement. At the longer wavelengths, however, the two curves begin to diverge. These results support the validity of the modeling technique.

Figure 4:
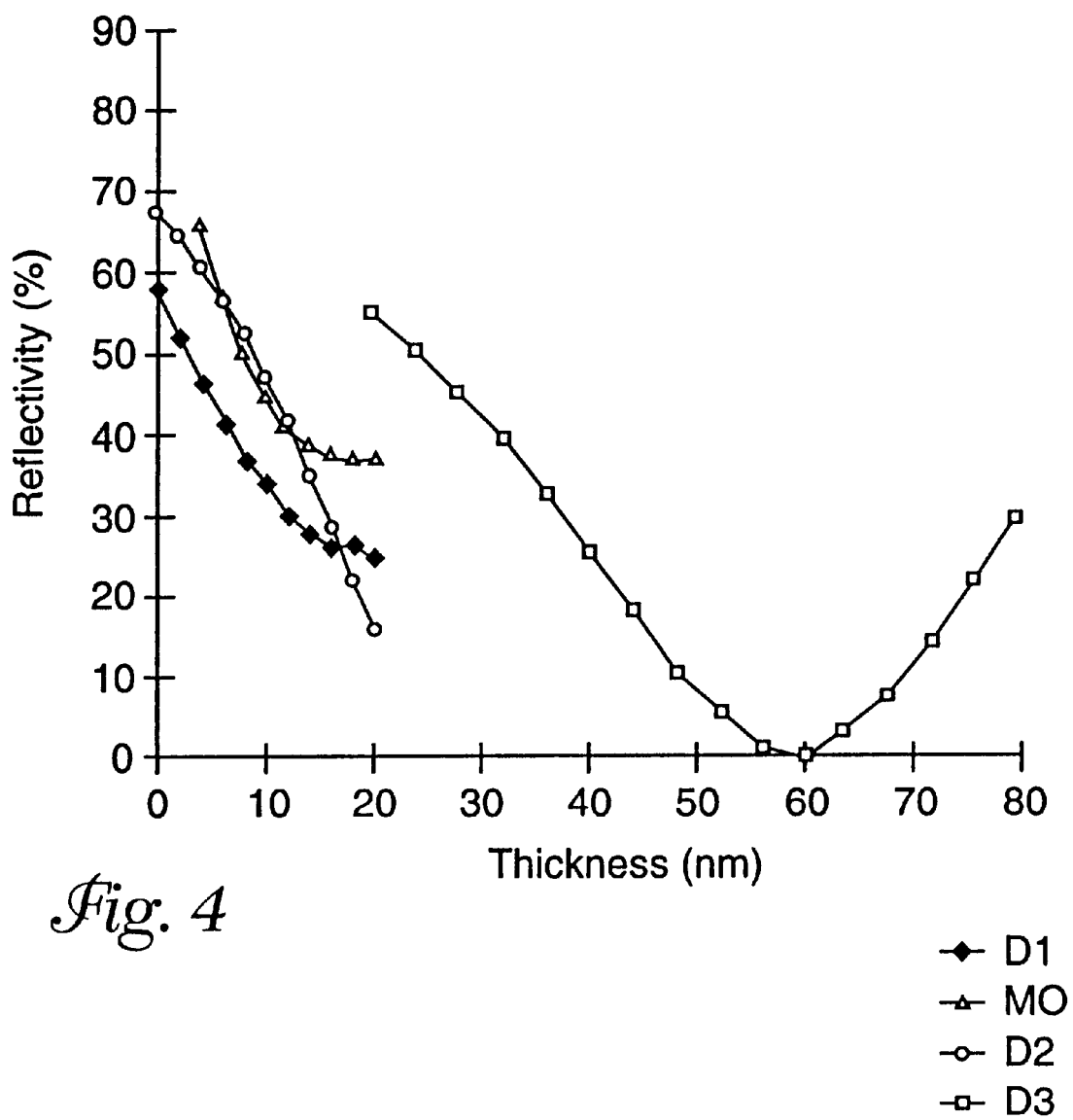
FIG. 4 is a graph illustrating the reflectivity response of a recording medium having a thin MO layer over different ranges of layer thicknesses.

The modeled reflectivity data versus layer thickness data, which was collected at a wavelength of 680 nm, is illustrated in the graph of FIG. 4. The thickness of each layer was varied separately. The data indicate that the thickness of each layer has a significant influence on the reflectivity of the media. For each layer, when the thickness is increased from the default value the reflectivity decreases. Of these responses, the influence of the D2 layer appears to be most significant.

Figure 5:
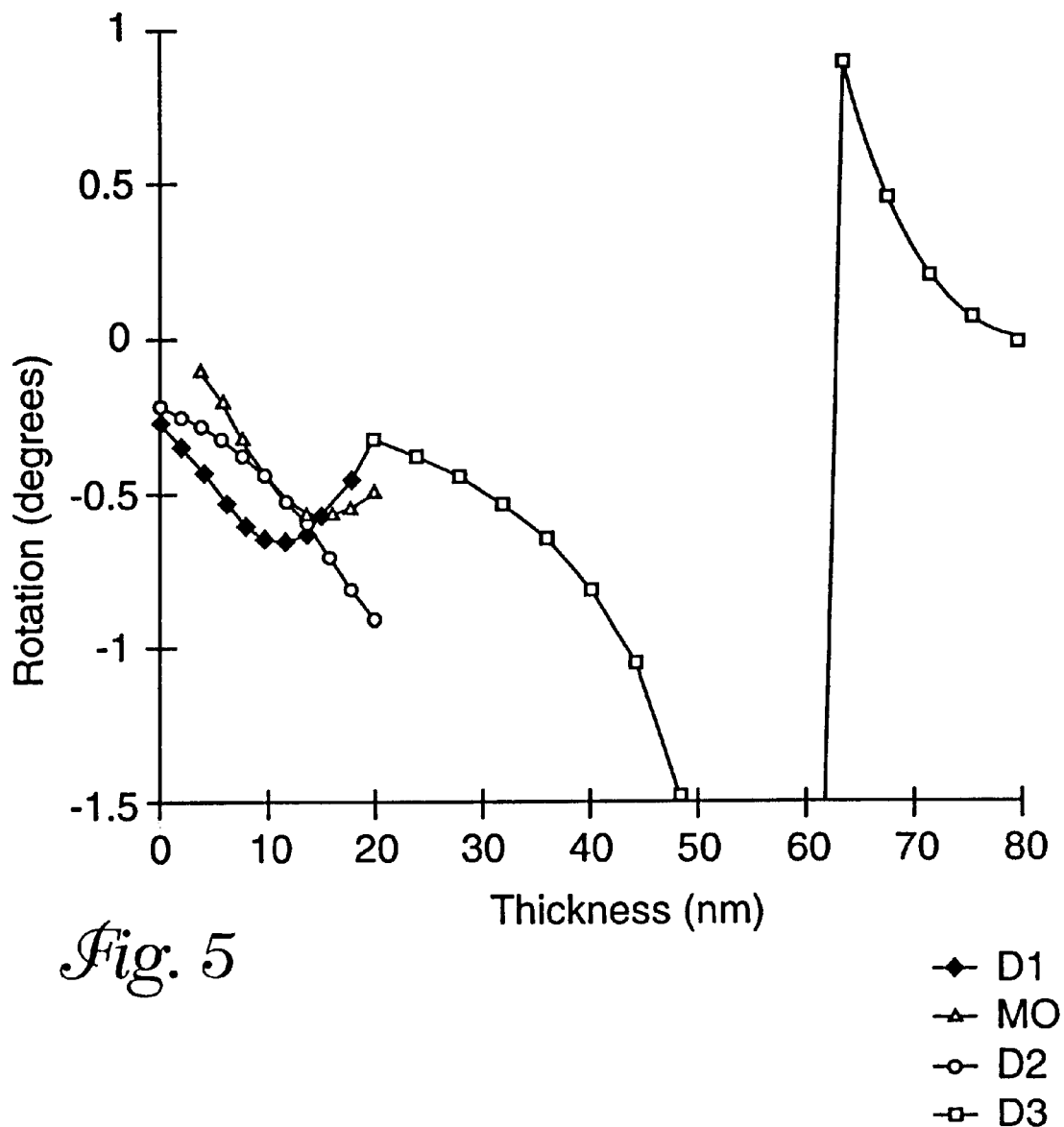
FIG. 5 is a graph illustrating the rotation response of a recording medium having a thin MO layer over different ranges of layer thicknesses.

Modeled rotation versus layer thickness data is shown in FIG. 5. The data indicate that increasing the thickness of any layer should increase rotation, with the D2 layer again having the largest influence. Although a maximum rotation is desirable, if the reflectivity decreases when making these changes, as suggested by the reflectivity data, the FOM will not increase. The FOM data, discussed below, sheds additional light.

Figure 6:
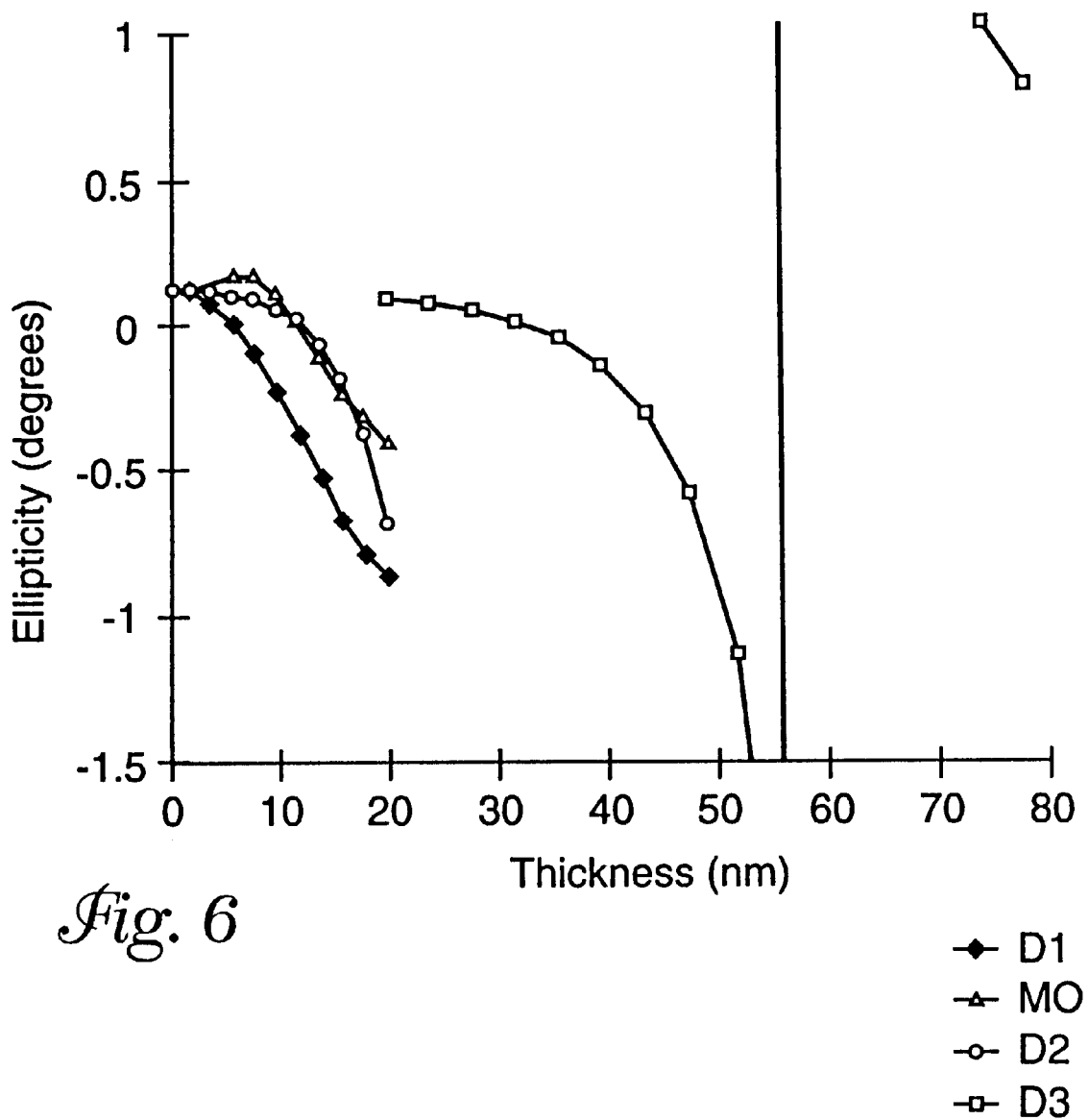
FIG. 6 is a graph illustrating the ellipticity response of a recording medium having a thin MO layer over different ranges of layer thicknesses.

The ellipticity versus layer thickness data is shown in FIG. 6. The results are similar to the rotation data, showing that the thickness of each layer has a significant influence. However, the D1 thickness has the largest influence.

Figure 7:
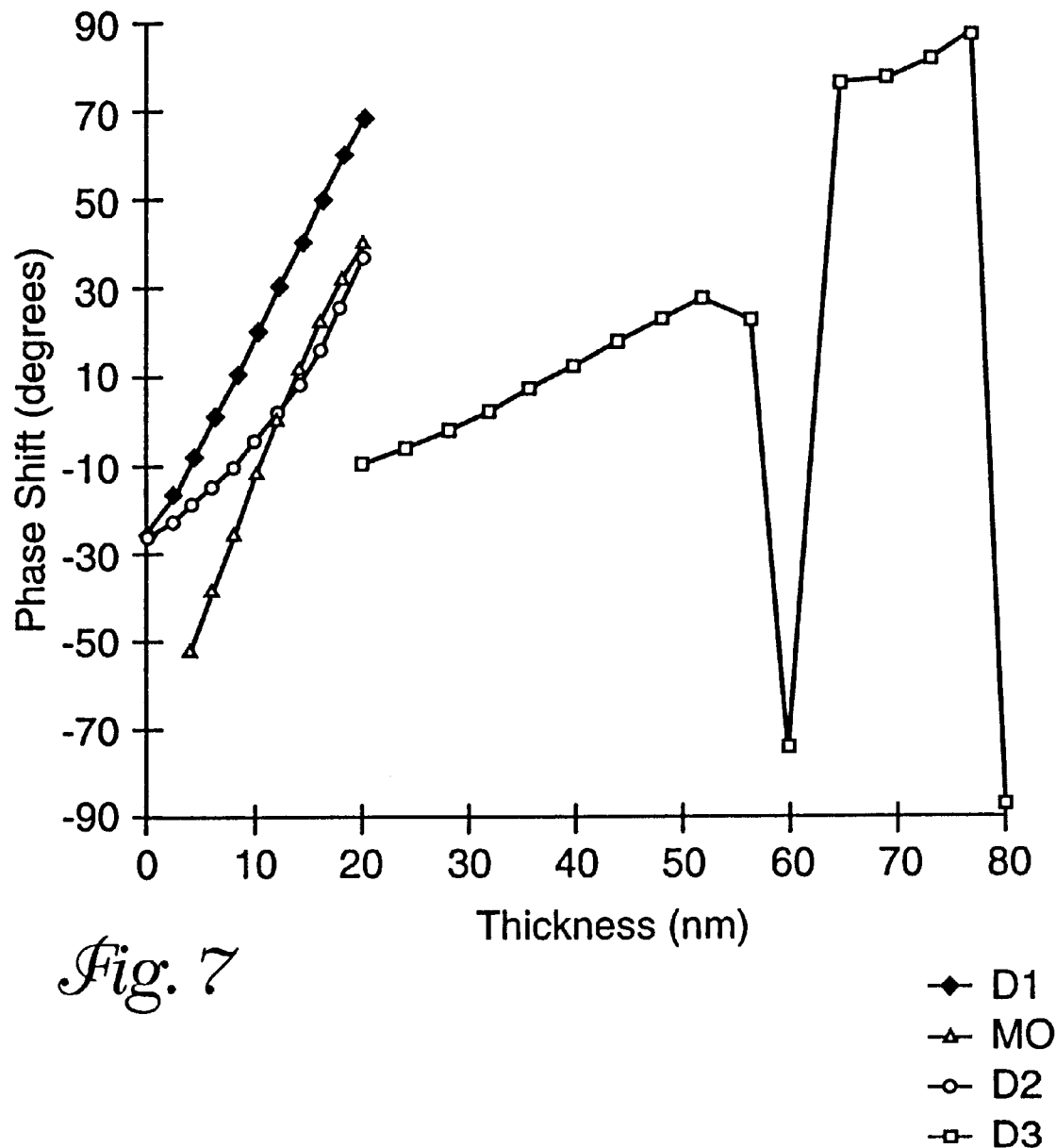
FIG. 7 is a graph illustrating the phase shift response of a recording medium having a thin MO layer over different ranges of layer thicknesses.

Phase shift was calculated using the modeling data. Specifically, phase shift was obtained by taking the inverse tangent of the elliptictity divided by the rotation. Because the drive can be tuned for any phase shift, the desired media phase shift need not be defined. For practical purposes, however, the phase shift of this film stack was tuned to near zero degrees. The phase shift versus layer thickness data is shown in FIG. 7. The data indicate that the D1, MO, and D2 thicknesses have a significant influence on the phase shift of the media. For each of the layers, the phase shift increases as the film thickness increases.

The FOM curves were also calculated using the modeling data. The formula for obtaining this data is the product of the reflectivity and the square root of the sum of the squares of the rotation and ellipticity. Because the FOM represents the total signal reaching the drive detectors, a large FOM is desired.

Figure 8:
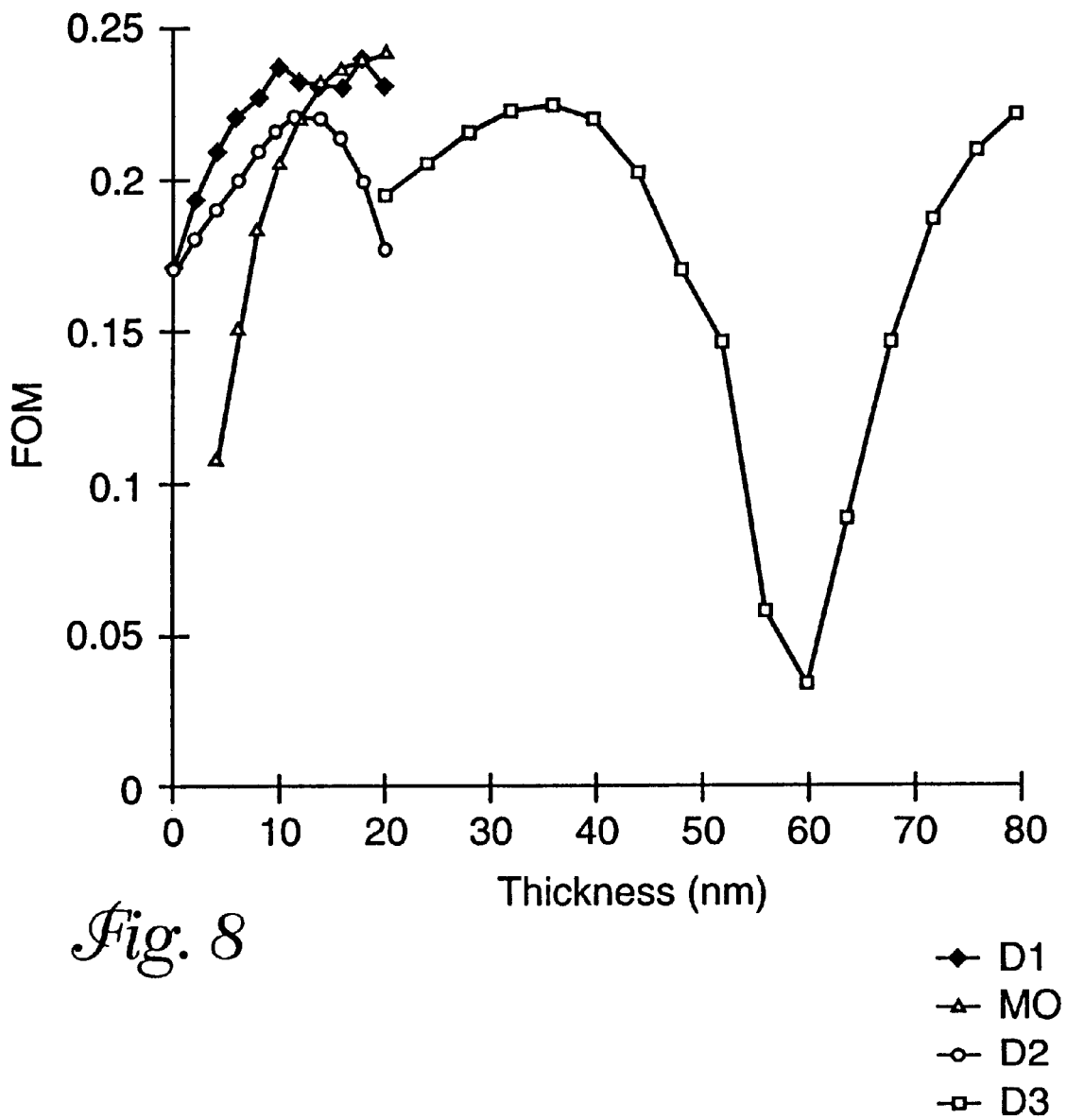
FIG. 8 is a graph illustrating the figure of merit (FOM) response of a recording medium having a thin MO layer over different ranges of layer thicknesses.

The FOM versus layer thickness data is illustrated in FIG. 8. The data indicate that the D2 and D3 layers in the example were very near optimum, but that a slight increase in the thickness of the D1 layer may be advantageous. The data also suggests that a thick MO layer will increase the FOM. However, a thicker MO layer degrades the magnetic characteristics of the media. In an attempt to optimize the FOM of this film design, the D1 thickness was increased from 6 nm to 10 nm. As a result, the FOM was increased from 22 to 23.

Figure 9:
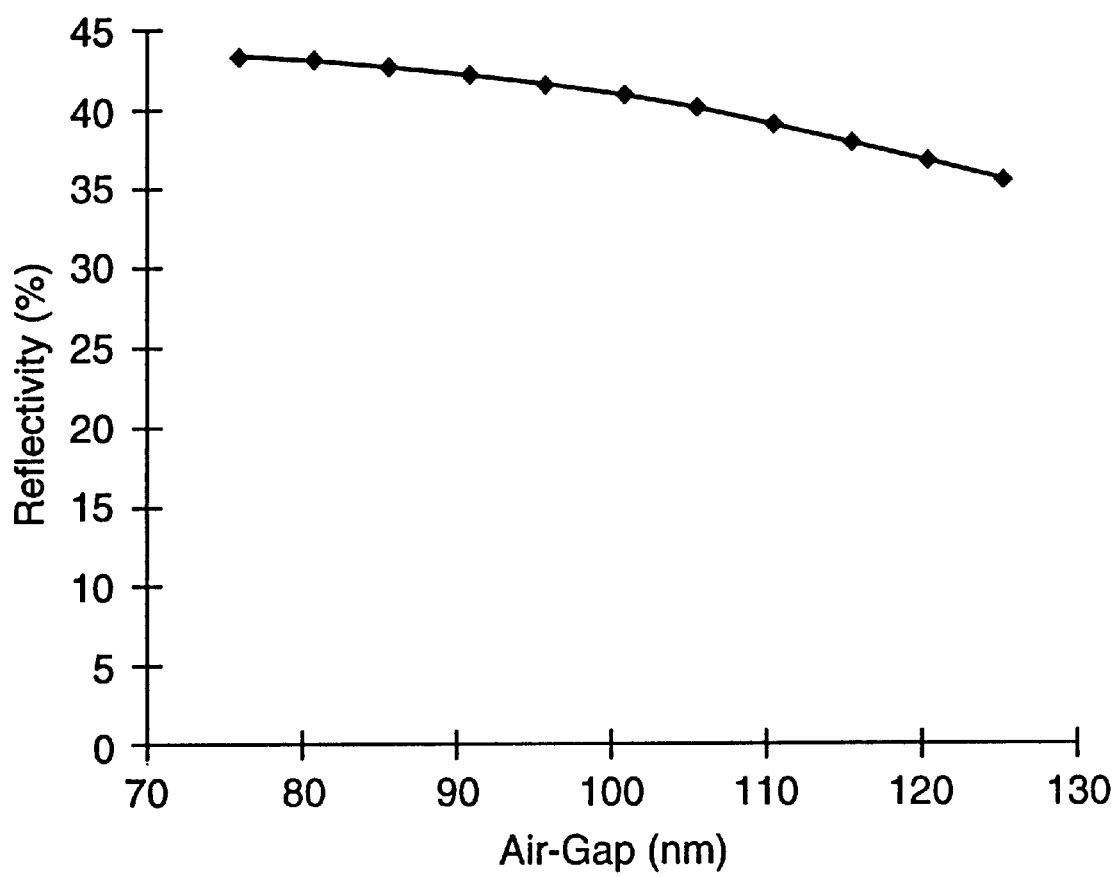
FIG. 9 is a graph illustrating the reflectivity response of a recording medium having a thin MO layer over different ranges of air gap thickness in an air-incident recording application.
Figure 10:
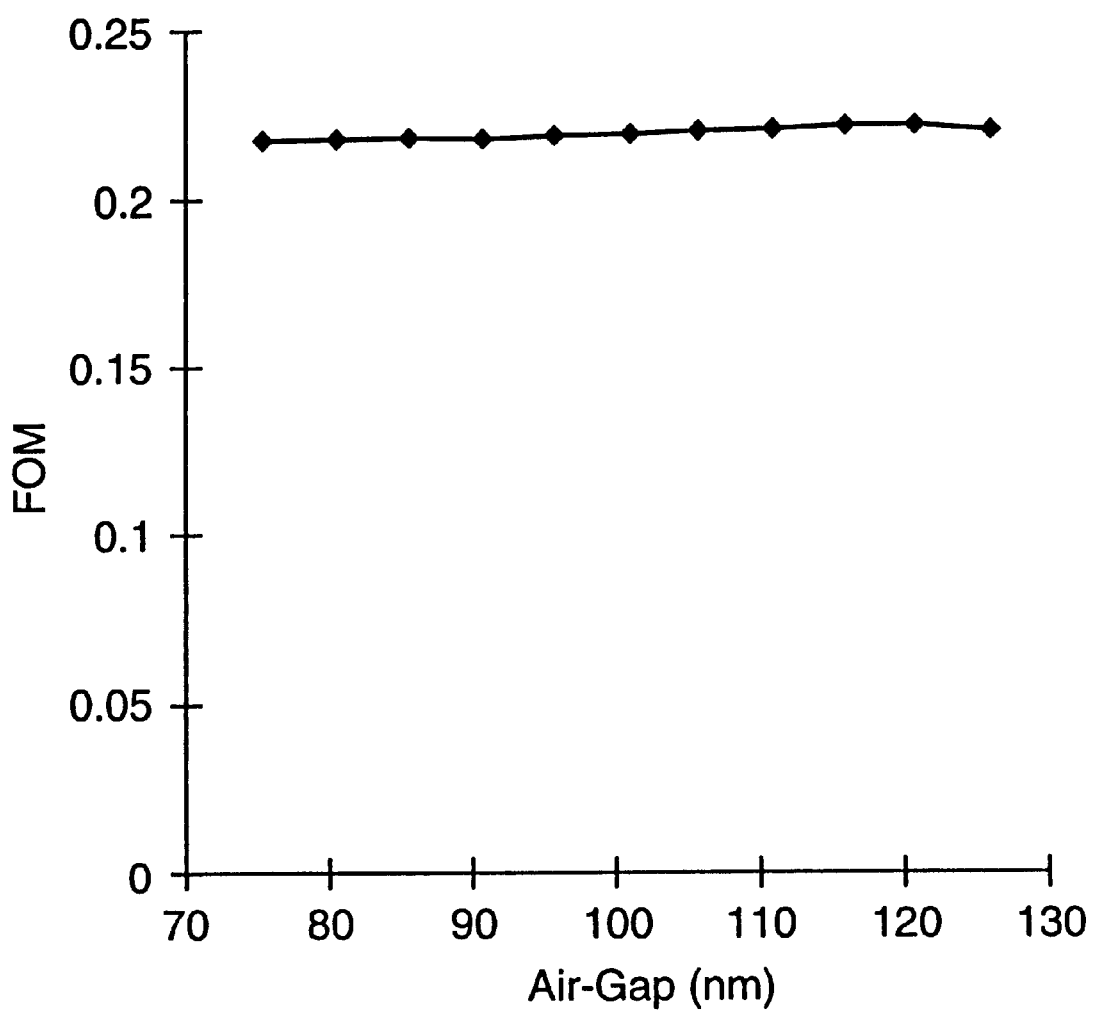
FIG. 10 is a graph illustrating the FOM response of a recording medium having a thin MO layer over different ranges of air gap thickness in an air-incident recording application.
Figure 11:
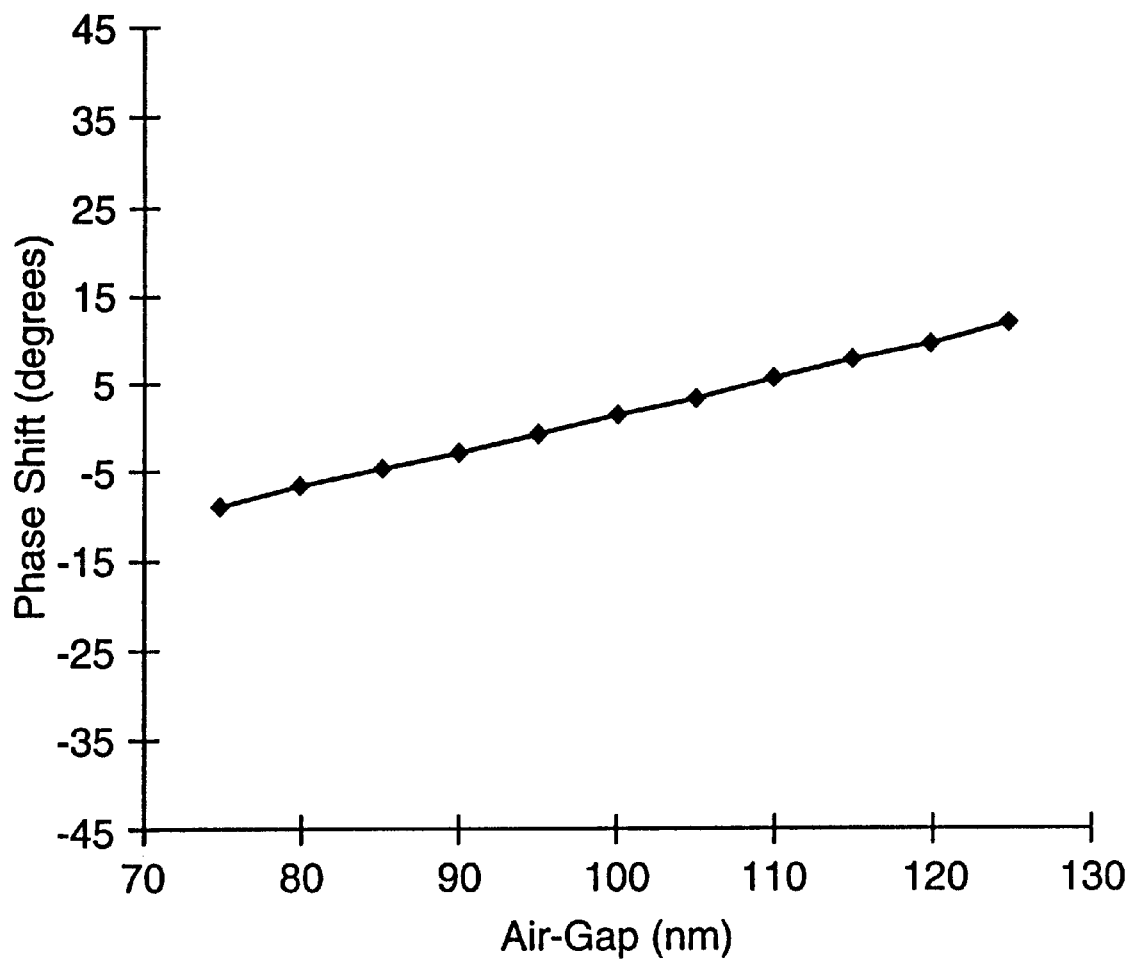
FIG. 11 is a graph illustrating the phase shift response of a recording medium having a thin MO layer over different ranges of air gap thickness in an air-incident recording application.

The reflectivity, FOM, and phase shift dependence on air-gap data are shown in FIGS. 9, 10, and 11, respectively. Each response shows a negligible dependence on the fly height of the SIL near-field head. These results are very positive and suggest that the default media is capable of performing well at all radii of the disk.

EXAMPLE 3

As mentioned above, the stability of the thin MO layer media is a concern. To characterize this stability, both optical and magnetic responses were measured with respect to time in an accelerated-aging environmental chamber at 80 degrees Celsius/85 percent relative humidity (80c/85rh). The critical response parameters used to evaluate the stability performance of this media were the CNR, reflectivity, Write Threshold (WT), $H_c$, FT and BER. For each response, the stability performance of the thin MO layer and standard MO layer media are compared. The media used in this third example were the same disks used in Example 1.

Accordingly, reference should be made to Table 1 for information concerning film composition and thickness.

The CNR and reflectivity dependence on environmental stress time was compared for the thin MO layer and standard MO layer media. Three disks for each media type were measured at 0, 100, 500 and 1100 hours of environmental stressing. The data were averaged and the actual and percent changes were calculated. The data, shown in Tables 6A, 6B, 7A, and 7B below, indicate that there is virtually no change in CNR and reflectivity responses for either media type. CNR data is shown in Tables 6A and 6B. Reflectivity data is shown in Tables 7A and 7B.

TABLE 6A

| CNR Std. MO | Hours @ 80 c/85 rh | | | | change | |
|---|---|---|---|---|---|---|
| Disk | 0 | 100 | 500 | 1100 | actual | (%) |
| 1 | 44.4 | 44.4 | 44.5 | 45.0 | | |
| 2 | 45.1 | 44.7 | 44.6 | 45.0 | | |
| 3 | 45.1 | 44.1 | 44.4 | 44.6 | | |
| Average | 44.9 | 44.4 | 44.5 | 44.9 | 0.0 | 0.0% |

TABLE 6B

| CNR Thin MO | Hours @ 80 c/85 rh | | | | change | |
|---|---|---|---|---|---|---|
| Disk | 0 | 100 | 500 | 1100 | actual | (%) |
| 1 | 45.5 | 45.6 | 45.1 | 44.4 | | |
| 2 | 45.0 | 44.1 | 44.2 | 44.0 | | |
| 3 | 43.6 | 44.0 | 43.2 | 43.9 | | |
| Average | 44.7 | 44.6 | 44.2 | 44.1 | −0.6 | 1.3% |

TABLE 7A

| Reflectivity Std. MO | Hours @ 80 c/85 rh | | | | change | |
|---|---|---|---|---|---|---|
| Disk | 0 | 100 | 500 | 1100 | actual | (%) |
| 1 | 24.1 | 24.7 | 24.6 | 24.7 | | |
| 2 | 23.9 | 24.7 | 24.4 | 24.0 | | |
| 3 | 23.6 | 24.4 | 24.3 | 24.4 | | |
| Average | 23.9 | 24.6 | 24.4 | 24.4 | 0.5 | 2.1% |

TABLE 7B

| Reflectivity Thin MO | Hours @ 80 c/85 rh | | | | change | |
|---|---|---|---|---|---|---|
| Disk | 0 | 100 | 500 | 1100 | actual | (%) |
| 1 | 17.0 | 17.4 | 17.3 | 17.2 | | |
| 2 | 17.8 | 18.5 | 18.2 | 18.0 | | |
| 3 | 16.5 | 16.6 | 16.6 | 16.5 | | |
| Average | 17.1 | 17.5 | 17.4 | 17.2 | 0.1 | 0.8% |

The WT is defined by the minimum laser power required to write a stable bit that exceeds a CNR of 8 dB. This sensitive response, which is influenced by the reflective layer of the media and the magnetic characteristics of the MO layer, was also characterized for both media types, as shown in Tables 8A and 8B below.

TABLE 8A

Write Threshold Std. MO

| Disk | Hours @ 80 c/85 rh | | | | change | |
|---|---|---|---|---|---|---|
| | 0 | 100 | 500 | 1100 | actual | (%) |
| 1 | 3.05 | 3.00 | 2.95 | 3.00 | | |
| 2 | 3.05 | 2.95 | 2.95 | 3.00 | | |
| 3 | 3.00 | 2.95 | 2.85 | 2.95 | | |
| Average | 3.03 | 2.97 | 2.92 | 2.98 | −0.05 | 1.6% |

TABLE 8B

Write Threshold Thin MO

| Disk | Hours @ 80 c/85 rh | | | | change | |
|---|---|---|---|---|---|---|
| | 0 | 100 | 500 | 1100 | actual | (%) |
| 1 | 3.15 | 3.05 | 3.00 | 2.95 | | |
| 2 | 3.10 | 2.95 | 2.80 | 2.80 | | |
| 3 | 2.95 | 2.75 | 2.55 | 2.60 | | |
| Average | 3.07 | 2.92 | 2.78 | 2.78 | −0.28 | 9.2% |

The data indicate that, after 1100 hours of stressing, the WT response of the thin MO layer media changed slightly more than that of the standard MO layer media. However, the results nevertheless indicate that WT values for both media are quite stable.

$H_c$ is defined by the minimum magnetic field required to flip the magnetic direction of a magnetic layer. $H_c$ also was characterized for both media types, as shown in Tables 9A and 9B below.

TABLE 9A $H_c$ Std. MO

| Disk | Hours @ 80 c/85 rh | | | | change | |
|---|---|---|---|---|---|---|
| | 0 | 100 | 500 | 1100 | actual | (%) |
| 1 | 7600 | 6700 | 6320 | 6060 | | |
| 2 | 7600 | 6700 | 6900 | 6550 | | |
| 3 | 8100 | 6900 | 6830 | 6440 | | |
| Average | 7767 | 6767 | 6683 | 6350 | −1417 | 18.2% |

TABLE 9B $H_c$ Thin MO

| Disk | Hours @ 80 c/85 rh | | | | change | |
|---|---|---|---|---|---|---|
| | 0 | 100 | 500 | 1100 | actual | (%) |
| 1 | 3000 | 2860 | 2810 | 2400 | | |
| 2 | 3500 | 3140 | 2790 | 2500 | | |
| 3 | 3100 | 2930 | 2590 | 2400 | | |
| Average | 3200 | 2977 | 2730 | 2433 | −767 | 24.0% |

The data show, as expected, that the $H_c$ level for the thin MO layer media is significantly smaller than that for the thicker MO layer media. However, the $H_c$ can be increased by raising the terbium concentration in the MO layer. Moreover, the $H_c$ for the thin MO layer media remained above acceptable levels.

For the change in $H_c$ due to the environmental stressing, the actual change for the thin MO layer media is smaller. However, the percent change is larger than that of the standard MO media. Again, for both media, the overall results are acceptable inasmuch as the $H_c$ behaves as expected and remains well above 2000 Oe.

Figure 12:
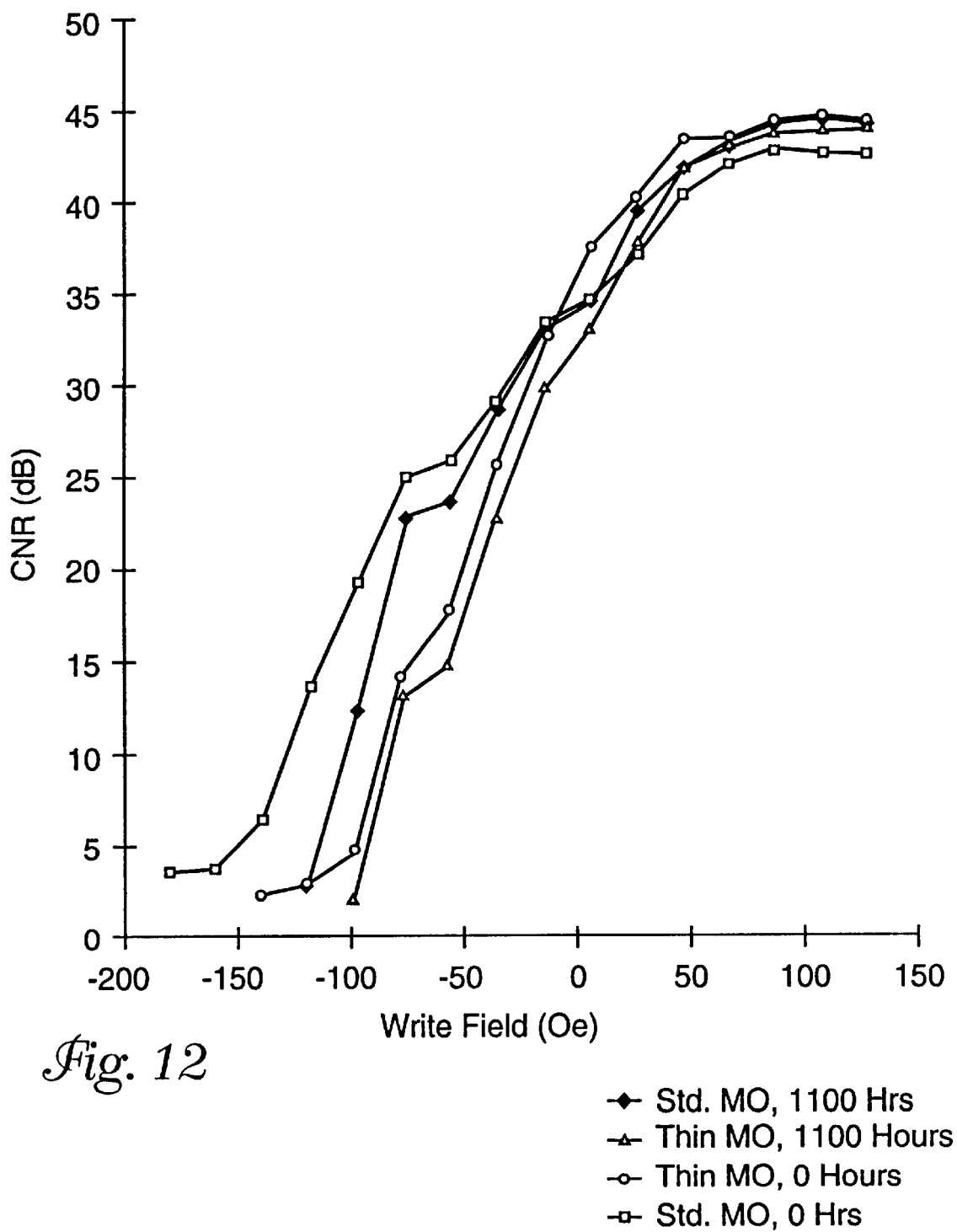
FIG. 12 is a graph illustrating the demagnetizing field threshold response of a recording medium having a thin MO layer following extended environmental stress testing.

The data from the FT dependence on environmental stressing study is shown in Tables 10A and 10B. As indicated by Tables 10A and 10B, both media types are fairly stable and perform in a similar manner. The field scan data collected to obtain the FT data is shown in FIG. 12. The field scan data shows a shift in power scans for both media types after 1100 hours of environmental stressing. The results are again positive, however, because the degree of change is small and the FT decreases with aging for both media types.

TABLE 10A

FT Std. MO

| Disk | Hours @ 80 c/85 rh | | | | change | |
|---|---|---|---|---|---|---|
| | 0 | 100 | 500 | 1100 | actual | (%) |
| 1 | −134 | −112 | −105 | −110 | | |
| 2 | −128 | −115 | −105 | −110 | | |
| 3 | −139 | −119 | −109 | −110 | | |
| Average | −134 | −115 | −106 | −110 | 23.7 | 17.7% |

TABLE 10B

FT Thin MO

| Disk | Hours @ 80 c/85 rh | | | | change | |
|---|---|---|---|---|---|---|
| | 0 | 100 | 500 | 1100 | actual | (%) |
| 1 | −95 | −90 | −89 | −85 | | |
| 2 | −90 | −85 | −80 | −80 | | |
| 3 | −85 | −65 | −57 | −58 | | |
| Average | −90 | −80 | −75 | −74 | 15.7 | 17.4% |

Figure 13:
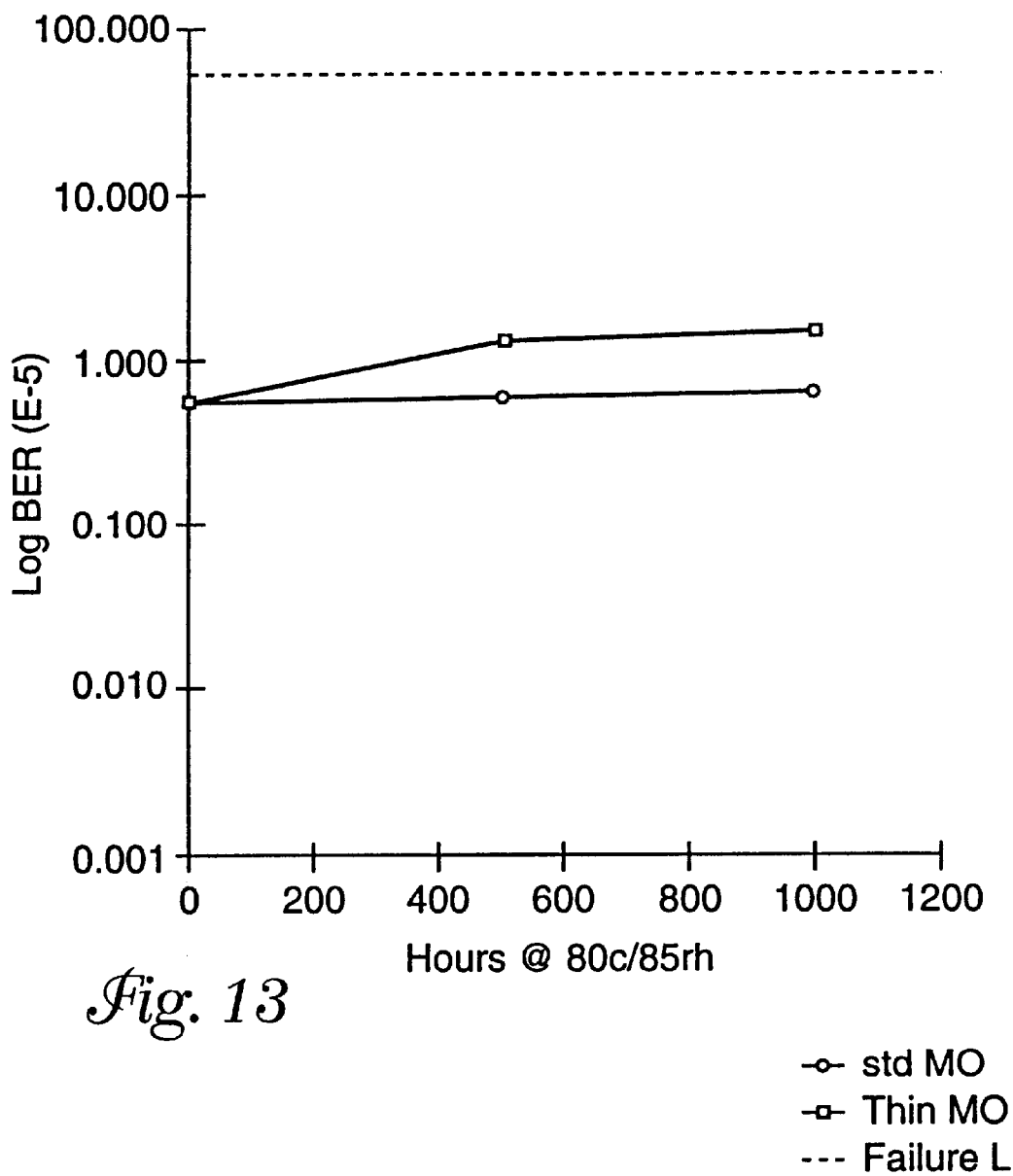
FIG. 13 is a graph illustrating the byte error rate (BER) response of a recording medium having a thin MO layer following extended environmental stress testing.

As discussed above, the initial drive performance of the standard MO layer media and thin MO layer media were compared in terms of BER. In this study, the same forty disks, twenty of each film type, were compared after 500 hours and 1000 hours of environmental stressing. The data that was collected using a read only test, were averaged and plotted in FIG. 13 The data again show that there is no significant difference in the initial BER level for both media types. The results show that the BER of the thin MO layer media increases slightly more quickly than that for the standard MO media under environmental stressing. Although the performance of the thin MO layer media falls short of the standard MO layer media BER performance, the overall results are acceptable. This is seen by comparing the plotted BER data to the failure criterion, as shown in FIG. 13.

The foregoing detailed description has been provided for a better understanding of the invention and is for exemplary purposes only. Modifications may be apparent to those skilled in the art without deviating from the spirit and scope of the appended claims.

What is claimed is:

1. An air-incident magneto-optic recording medium comprising in order:

a substrate;

a reflective layer;

a first dielectric layer;

a magneto-optic recording layer; and a second dielectric layer, wherein the recording layer has a thickness of less than or equal to approximately 15 nm and a demagnetizing threshold of less than or equal to approximately 150 Oe.

2. The recording medium of claim 1, wherein the recording layer has a thickness of less than or equal to approximately 12 nm.

3. The recording medium of claim 1, wherein the recording layer, the first dielectric layer, and the second dielectric layer have a combined thickness of less than or equal to 75 nm.

4. The recording medium of claim 1, further comprising a third dielectric layer disposed adjacent the second dielectric layer opposite the recording layer, wherein the first dielectric layer, the second dielectric layer, the third dielectric layer, the recording layer, and the reflective layer have a combined thickness of less than or equal to approximately 185 nm.

5. The recording medium of claim 1, wherein the first dielectric layer, the second dielectric layer, the recording layer, and the reflective layer have a combined thickness of less than or equal to approximately 135 nm.

6. The recording medium of claim 1, wherein each of the first and second dielectric layers comprises a silicon carbide material.

7. The recording medium of claim 1, wherein the recording layer is selected to provide a demagnetizing field threshold of less than or equal to approximately 120 Oe.

8. The recording medium of claim 1, wherein the first dielectric layer comprises a dielectric material having an average surface roughness of less than or equal to approximately 1 nm.

9. An air-incident, magneto-optic recording medium comprising in order:
a substrate;
a reflective layer;
a first dielectric layer;
a magneto-optic recording layer; and
a second dielectric layer,
wherein the recording layer has a thickness that is selected to provide a demagnetizing field threshold of less than or equal to approximately 150 Oe.

10. The recording medium of claim 9, wherein the recording layer is selected to provide a demagnetizing field threshold of less than or equal to approximately 120 Oe.

11. The recording medium of claim 9, wherein the recording layer has a demagnetizing field threshold that is responsive to magnetic fields in a range of less than or equal to approximately 120 Oe and greater than or equal to approximately 80 Oe.

12. The recording medium of claim 9, further comprising a third dielectric layer disposed adjacent the second dielectric layer opposite the recording layer, wherein the first dielectric layer, the second dielectric layer, the third dielectric layer, the recording layer, and the reflective layer have a combined thickness of less than or equal to approximately 185 nm.

13. The recording medium of claim 9, wherein the first dielectric layer, the second dielectric layer, the recording layer, and the reflective layer have a combined thickness of less than or equal to approximately 135 nm.

14. The recording medium of claim 9, wherein each of the first and second dielectric layers comprises a silicon carbide material.

15. The recording medium of claim 9, wherein the first dielectric layer comprises a dielectric material having an average surface roughness of less than or equal to approximately 1 nm.

16. A magneto-optic recording medium comprising in order:
a substrate;
a first dielectric layer;
a single magneto-optic recording layer; and
a second dielectric layer,
wherein the recording layer has a thickness of less than or equal to approximately 12 nm and a demagnetizing threshold of less than or equal to approximately 150 Oe.

17. The recording medium of claim 16, wherein the recording layer has a thickness in a range of less than or equal to approximately 12 nm and greater than or equal to approximately 6 nm.

18. The recording medium of claim 16, wherein the recording layer, the first dielectric layer, and the second dielectric layer have a combined thickness of less than or equal to 75 nm.

19. The recording medium of claim 16, further comprising a third dielectric layer disposed adjacent the second dielectric layer opposite the recording layer, wherein the first dielectric layer, the second dielectric layer, the third dielectric layer, and the recording layer have a combined thickness of less than or equal to approximately 125 nm.

20. The recording medium of claim 16, further comprising a reflective layer disposed adjacent the substrate, wherein the first dielectric layer, the second dielectric layer, the recording layer, and the reflective layer have a combined thickness of less than or equal to approximately 135 nm.

21. The recording medium of claim 16, wherein each of the first and second dielectric layers comprises a silicon carbide material.

22. The recording medium of claim 16, wherein the recording layer is selected to provide a demagnetizing field threshold of less than or equal to approximately 120 Oe.

23. The recording medium of claim 16, wherein the first dielectric layer comprises a dielectric material having an average surface roughness of less than or equal to approximately 1 nm.

24. A magneto-optic recording medium comprising in order:
a substrate;
a first dielectric layer;
a single magneto-optic recording layer; and
a second dielectric layer,
wherein the recording layer is selected to provide a demagnetizing field threshold of less than or equal to approximately 150 Oe.

25. The recording medium of claim 24, wherein the recording layer is selected to provide a demagnetizing field threshold of less than or equal to approximately 120 Oe.

26. The recording medium of claim 24, wherein the recording layer, the first dielectric layer, and the second dielectric layer have a combined thickness of less than or equal to 75 nm.

27. The recording medium of claim 24, further comprising a third dielectric layer disposed adjacent the second dielectric layer opposite the recording layer, wherein the first dielectric layer, the second dielectric layer, the third dielectric layer, and the recording layer have a combined thickness of less than or equal to approximately 125 nm.

28. The recording medium of claim 24, further comprising a reflective layer disposed adjacent the substrate, wherein the first dielectric layer, the second dielectric layer, the recording layer, and the reflective layer have a combined thickness of less than or equal to approximately 135 nm.

29. The recording medium of claim 24, wherein each of the first and second dielectric layers comprises a silicon carbide material.

30. The recording medium of claim 17, wherein the first dielectric layer comprises a dielectric material having an average surface roughness of less than or approximately 1 nm.

31. An air-incident magneto-optic recording medium comprising a magneto-optic recording layer having a thickness of less than or equal to approximately 15 nm and a demagnetizing threshold of less than or eaual to approximately 150 Oe.

32. The recording medium of claim 31, wherein the recording layer has a thickness of less than or equal to approximately 12 nm.

33. The recording medium of claim 31, wherein the recording layer is selected to provide a demagnetizing field threshold of less than or equal to approximately 120 Oe.

34. A substrate-incident, magneto-optic recording medium comprising in order:

a substrate;

a first dielectric layer;

a single magneto-optic recording layer;

a second dielectric layer; and a reflective layer, wherein the recording layer has a thickness of less than or equal to approximately 15 nm and a demagnetizing threshold of less than or equal to approximately 150 Oe.

35. The recording medium of claim 34, wherein the recording layer has a thickness of less than or equal to approximately 12 nm.

36. The recording medium of claim 34, wherein the recording layer is selected to provide a demagnetizing field threshold of less than or equal to approximately 120 Oe.

37. A system for substrate-incident, magneto-optic recording, the system comprising a recording medium having a substrate and a single magneto-optic recording layer having a thickness of less than or equal to approximately 15 nm and a demagnetizing threshold of less than or equal to approximately 150 Oe, a radiation source oriented to direct a beam of radiation to the magneto-optic recording layer via the substrate, and a detector oriented to receive a reflected component of the beam of radiation and generate a data signal based on the content of the beam of radiation.

38. A system for air-incident, magneto-optic recording, the system comprising a recording medium having a substrate and a single magneto-optic recording layer having a thickness of less than or equal to approximately 15 nm and a demagnetizing threshold of less than or equal to approximately 150 Oe, a radiation source oriented to direct a beam of radiation to the magneto-optic recording layer from a side of the recording medium opposite the substrate, and a detector oriented to receive a reflected component of the beam of radiation and generate a data signal based on the content of the beam of radiation.

39. A recording medium comprising a magneto-optic recording layer having a demagnetizing threshold of less than or equal to approximately 150 Oe.

40. The medium of claim 39, wherein the magneto-optic recording layer has a demagnetizing threshold of less than or equal to approximately 120 Oe.

41. The medium of claim 39, wherein the magneto-optic recording layer has a thickness of less than or equal to approximately 12 nm.

* * * * *